(12) United States Patent
Kondo et al.

(10) Patent No.: US 7,025,054 B2
(45) Date of Patent: Apr. 11, 2006

(54) METHOD OF CUTTING RARE-EARTH ALLOY

(75) Inventors: Sadahiko Kondo, Takarazuka (JP); Akira Miyachi, Takatsuki (JP); Hazime Ishida, Takatsuki (JP)

(73) Assignee: Neomax Co., Ltd., Osaka (JP)

( * ) Notice: Subject to any disclaimer, the term of this patent is extended or adjusted under 35 U.S.C. 154(b) by 14 days.

(21) Appl. No.: 10/506,318

(22) PCT Filed: Feb. 26, 2003

(86) PCT No.: PCT/JP03/02161

§ 371 (c)(1),
(2), (4) Date: Sep. 1, 2004

(87) PCT Pub. No.: WO03/074229

PCT Pub. Date: Sep. 12, 2003

(65) Prior Publication Data

US 2005/0155595 A1 Jul. 21, 2005

(30) Foreign Application Priority Data

Mar. 1, 2002 (JP) ............................. 2002-055164

(51) Int. Cl.
| | |
|---|---|
| B26D 1/44 | (2006.01) |
| B26D 7/20 | (2006.01) |
| B26D 7/10 | (2006.01) |
| B23P 17/00 | (2006.01) |
| B28D 1/08 | (2006.01) |

(52) U.S. Cl. .................... 125/21; 83/651.1; 83/171; 83/16; 29/412; 29/607

(58) Field of Classification Search ............ 125/21; 83/651.1, 171, 16; 29/607, 412

See application file for complete search history.

(56) References Cited

U.S. PATENT DOCUMENTS

| | | | |
|---|---|---|---|
| 4,770,723 A | 9/1988 | Sagawa et al. | |
| 4,792,368 A | 12/1988 | Sagawa et al. | |
| 6,070,570 A | 6/2000 | Ueoka et al. | |
| 6,837,778 B1 * | 1/2005 | Kondo et al. | ............. 451/49 |

FOREIGN PATENT DOCUMENTS

| | | |
|---|---|---|
| JP | 05-138537 | 6/1993 |
| JP | 08-057847 | 3/1996 |
| JP | 09-290361 | 11/1997 |

(Continued)

Primary Examiner—Joseph J. Hail, III
Assistant Examiner—Bryan Muller
(74) Attorney, Agent, or Firm—Keating & Bennett, LLP

(57) ABSTRACT

A method of cutting a rare-earth alloy with a wire saw, obtained by fixing abrasive grains on a core wire with a resin layer, includes the step of moving the wire saw while a portion of the rare-earth alloy being machined with the wire saw is immersed in a coolant, which is mainly composed of water and has a surface tension of about 25 mN/m to about 60 mN/m at about 25° C., thereby cutting the rare-earth alloy. In the wire saw, an average distance between two of the abrasive grains, which are adjacent to each other in a length direction, is about 150% to less than about 400% of the average grain size of the abrasive grains, an average height of portions of the abrasive grains, protruding from the surface of the resin layer, is about 70% or less of the average grain size of the abrasive grains, and a thickness deviation percentage of the resin layer with respect to the core wire is about 40%.

26 Claims, 6 Drawing Sheets

FOREIGN PATENT DOCUMENTS

| | | |
|---|---|---|
| JP | 11-198018 | 7/1999 |
| JP | 11-198020 | 7/1999 |
| JP | 2000-218504 | 8/2000 |
| JP | 2001-047363 | 2/2001 |
| JP | 2001-164240 | 6/2001 |
| JP | 2001-232570 | 8/2001 |
| JP | 2002-036113 | 2/2002 |
| JP | 2003-080449 | 3/2003 |

* cited by examiner

<ABRASIVE GRAIN GAP 200%>

<ABRASIVE GRAIN GAP 300%>

METHOD OF CUTTING RARE-EARTH ALLOY

BACKGROUND OF THE INVENTION

1. Field of the Invention

The present invention relates to a method of cutting a rare-earth alloy and more particularly, the present invention relates to a method of cutting a rare-earth alloy with a wire saw, which is obtained by fixing abrasive grains on a core wire.

2. Description of the Related Art

A rare-earth alloy is used as a material to make a strong magnet. A rare-earth magnet, obtained by magnetizing a rare-earth alloy, can be used effectively as a magnet for a voice coil motor, which is used to position a magnetic head in a magnetic recorder, for example.

In the prior art, a rare-earth alloy material (e.g., in the form of an ingot or a sintered body) is often cut by a technique of slicing the material with a rotating slicing blade, for example. In this slicing blade cutting process, however, the cutting edge is relatively thick, thus requiring a lot of machining allowance. As a result, the yield of the rare-earth alloy material is so low that it increases the cost of resultant rare-earth alloy products (e.g., rare-earth magnets).

A wire saw cutting process is known as a cutting method that requires smaller machining allowance than the slicing blade cutting process does. For example, Japanese Laid-Open Publication No. 11-198020 discloses that a hard and brittle material such as silicon, glass, neodymium or ferrite may be cut with a wire saw, which is obtained by fixing superabrasive grains on the outer surface of a high-hardness core wire with a bonding layer (which will be referred to herein as a "fixed abrasive wire saw").

If a number of plates with a predetermined thickness can be obtained at the same time by cutting a rare-earth alloy material with such a fixed abrasive wire saw with small machining allowance, then the manufacturing cost of rare-earth magnets can be reduced significantly. However, nobody has ever reported that a rare-earth alloy could be cut successfully with such a fixed abrasive wire saw at a mass-producible level.

The present inventors carried out extensive research on this phenomenon and discovered the major cause of this problem in a significant difference in mechanical property between a rare-earth alloy produced by a sintering process (which will be referred to herein as a "rare-earth sintered alloy") and silicon, for example. More specifically, a rare-earth sintered alloy includes an overall hard and brittle main phase (i.e., $R_2Fe_{14}B$ crystal grains) and a grain boundary phase that causes ductile fracture. Accordingly, unlike a hard and brittle material such as silicon, the rare-earth sintered alloy is not so easy to cut. That is to say, compared with cutting silicon or any other hard and brittle material, higher cutting resistance is produced and a huge quantity of heat is generated, too. Also, the specific gravity of a rare-earth alloy is approximately 7.5, which is much higher than that of silicon or any other hard and brittle material. For that reason, cutting debris (or sludge), produced by the machining process, cannot be easily flushed away from the machined portion.

Thus, to cut a rare-earth alloy with high machining accuracy and efficiency, it is necessary to not only decrease the cutting resistance sufficiently but also efficiently dissipate the heat to be generated during the cutting process (i.e., efficiently cool the machined portion). Furthermore, it is also necessary to efficiently flush away the cutting debris produced by the cutting process.

For that purpose, by supplying the rare-earth alloy machined portion with plenty of highly lubricating coolant (which will also be referred to herein as a "cutting fluid"), the cutting resistance can be decreased and the heat generated during the cutting process can be dissipated efficiently. The present inventors discovered and confirmed via experiments that if a wire saw is wet with a sufficient amount of an oil coolant, then the traveling wire saw can supply a narrow machined portion with plenty of that coolant.

When such an oil coolant is used, however, it costs a lot to process its waste so as not to create any environmental damage and it is difficult to recycle the waste or cutting debris because the cutting debris is hard to separate from the waste. In view of these considerations, water (or an aqueous coolant) is preferably used as the coolant. However, if water is used as a coolant, then it is impossible to keep a sufficient amount of water deposited on the traveling wire saw because water has low viscosity (with a kinematic viscosity of 1.0 $mm^2/s$). As a result, even if the wire saw was wet with water, a sufficient amount of water could not be supplied to the machined portion.

Japanese Laid-Open Publication No. 11-198020 discloses that by moving the wire saw through a coolant overflowing from a coolant vessel, the coolant can be kept deposited on the wire saw just as intended even in a situation where a fixed abrasive wire saw needs to travel at a high velocity (e.g., at 2,000 m/min). However, the present inventors discovered via experiments that even when a rare-earth alloy was cut with a wire saw traveling through such overflowing water (as disclosed in Japanese Laid-Open Publication No. 11-198020, for example), the abrasive grains still dropped off, the resin layer peeled off, or the wire saw snapped in a worst case scenario. These inconveniences also happened even when the wire saw traveled at a velocity of about 800 m/min.

SUMMARY OF THE INVENTION

In order to overcome the problems described above, preferred embodiments of the present invention extend the life of a wire saw when a rare-earth alloy is cut with a wire saw machine using a coolant mainly composed of water.

A rare-earth alloy cutting method according to preferred embodiments of the present invention is a method of cutting a rare-earth alloy with a wire saw obtained by fixing abrasive grains on a core wire with a resin layer. The method includes the step of moving the wire saw while a portion of the rare-earth alloy being machined with the wire saw is immersed in a coolant, which is mainly composed of water and has a surface tension of about 25 mN/m to about 60 mN/m at about 25° C., thereby cutting the rare-earth alloy. In the wire saw, an average distance between two of the abrasive grains, which are adjacent to each other in a length direction, is about 150% to less than about 400% of the average grain size of the abrasive grains, an average height of portions of the abrasive grains, protruding from the surface of the resin layer, is about 70% or less of the average grain size of the abrasive grains, and a thickness deviation percentage of the resin layer with respect to the core wire is about 40%, thereby achieving the advantages described above.

A coolant mainly composed of water for use in another rare-earth alloy cutting method according to a preferred embodiment of the present invention may also be specified by its kinetic friction coefficient, not the surface tension thereof. In that case, a coolant, having a kinetic friction coefficient of about 0.1 to about 0.3 at about 25° C. with respect to the rare-earth alloy, may be used.

The average grain size D of the abrasive grains preferably satisfies 20 μm ≦ D ≦ 60 μm.

The core wire preferably has a diameter of about 0.15 mm to about 0.2 mm.

In a preferred embodiment, the step of moving the wire saw includes the step of moving the wire saw on a plurality of rollers. Each of the plurality of rollers preferably includes a polymer layer on which a guide groove is provided, the guide groove has a pair of sloped surfaces, at least one of which defines an angle of about 25 degrees to less than about 45 degrees with respect to a radial direction of the roller, and the wire is passed between the sloped surfaces.

The resin layer is preferably made of a phenol resin, an epoxy resin or a polyimide resin.

In a preferred embodiment, the rare-earth alloy is an R—Fe—B based rare-earth sintered alloy and may be an Nd—Fe—B based rare-earth sintered alloy.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 5A and 5B schematically illustrate the distributions of abrasive grains on the wire saw that can be used effectively to carry out the rare-earth alloy cutting method of a preferred embodiment of the present invention wherein FIG. 5A shows a situation where the average distance L between two adjacent abrasive grains is about 200% of the average grain size of the abrasive grains, and FIG. 5B shows a situation where the average distance L is about 300% of the average grain size.

DETAILED DESCRIPTION OF PREFERRED EMBODIMENTS

Figure 1A:
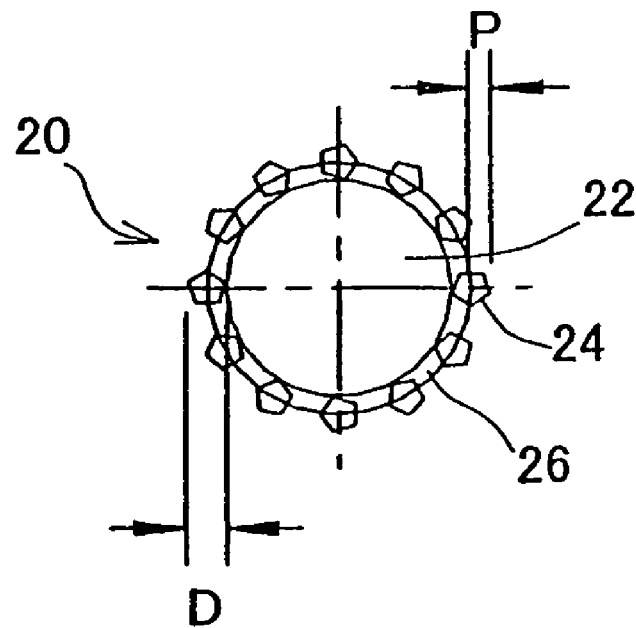
FIG. 1A is a schematic cross-sectional view showing how to define an abrasive grain protruding ratio for a wire saw.

A rare-earth alloy cutting method according to a preferred embodiment of the present invention uses a wire saw obtained by fixing abrasive grains (which are preferably diamond abrasive grains) on a core wire (which is preferably a piano wire) with a resin layer. The method includes the step of moving the wire saw while a portion of the rare-earth alloy being machined with the wire saw is immersed in a coolant, which preferably is mainly composed of water and which preferably has a surface tension of about 25 mN/m to about 60 mN/m at about 25° C., thereby cutting the rare-earth alloy. In the wire saw, an average distance between two of the abrasive grains, which are adjacent to each other in a length direction (i.e., the wire saw traveling direction), is preferably about 150% to less than about 400% of the average grain size of the abrasive grains, an average height of portions of the abrasive grains, protruding from the surface of the resin layer, is preferably about 70% or less of the average grain size of the abrasive grains, and a thickness deviation percentage of the resin layer with respect to the core wire is preferably about 40%. Optionally, a coolant having a kinetic friction coefficient of about 0.1 to about 0.3 with respect to the rare-earth alloy at about 25° C. may also be used as the coolant.

In the rare-earth alloy cutting method of this preferred embodiment of the present invention, the process step of cutting a rare-earth alloy with a fixed abrasive wire saw is carried out with its machined portion immersed in a coolant having a surface tension of about 25 mN/m to about 60 mN/m (i.e., about 25 dyn/cm to about 60 dyn/cm) at about 25° C. Thus, the wire saw can be cooled efficiently. A coolant having a surface tension that falls within this range exhibits higher wettability (i.e., conformability) with respect to the rare-earth alloy and/or wire saw than water does. For that reason, the coolant would penetrate the machined portion (i.e., the portion where the rare-earth alloy and wire saw contact each other, where the rare-earth alloy is being machined and which will be also referred to herein as a "machined groove") efficiently enough. The coolant mainly composed of water naturally has a higher specific heat than an oil coolant (e.g., a mineral oil), and therefore, achieves higher cooling efficiency. As used herein, the "coolant mainly composed of water" refers to a coolant, of which at least approximately 70 wt % is water.

A preferred coolant, which is used effectively in the rare-earth alloy cutting method of preferred embodiments of the present invention, can also be determined by its kinetic friction coefficient with respect to the rare-earth alloy. Specifically, a coolant having a kinetic friction coefficient of about 0.1 to about 0.3 at approximately 25° C. achieves the same functions and effects as a coolant having a surface tension that falls within the range specified above. The surface tension is regarded as an index to the permeability of the coolant with respect to the machined portion. On the other hand, the kinetic friction coefficient is regarded as an index to the degree of lubricity produced by the coolant in the machined portion. It is also known that there is a qualitative correlation between the surface tension and the kinetic friction coefficient.

The surface tension of the coolant is measured with a well-known DuNouy Tensiometer. Also, the kinetic friction coefficient of the coolant with respect to the rare-earth alloy is measured with a Masuda's "Four-ball Friction Tester", which is often used as a basic tester in Japan. The values of both the surface tension and kinetic friction coefficient at about 25° C. are preferably adopted herein as parameters characterizing the coolant.

It should be noted that the kinetic friction coefficients that will be cited in the specific examples to be described later were obtained with a four-ball friction tester including iron balls. The R—Fe—B based rare-earth alloy to be adopted as an example (where R is one of the rare-earth elements including Y and which is an alloy including an $Nd_2Fe_{14}B$ intermetallic compound as a main phase, for example) includes iron at a higher percentage than any other constituent element thereof. Accordingly, the kinetic friction coefficient of the coolant, obtained with the iron balls, should be a well-approximated kinetic friction coefficient with respect to the rare-earth alloy. The present inventors actually confirmed this point via experiments. The composition and manufacturing process of a rare-earth alloy that can be used effectively as a material for a rare-earth magnet are disclosed in U.S. Pat. Nos. 4,770,723 and 4,792,368, for example. In a typical composition of an R—Fe—B based rare-earth alloy, Nd or Pr is often used as R, a portion of Fe may be replaced with a transition element (such as Co), and a portion of B may be replaced with C.

The coolant for use in the cutting process of preferred embodiments of the present invention is determined by either the surface tension or the kinetic friction coefficient at approximately 25° C. However, the temperature of the coolant is not always about 25° C. during its actual use. Nevertheless, to achieve the effects and advantages of preferred embodiments of the present invention, the temperature of the coolant to be used is preferably controlled to fall within the range of about 15° C. to about 35° C., more preferably within the range of about 20° C. to about 30° C., and even more preferably within the range of about 23° C. to about 28° C. As is well known in the art, the surface tension and kinetic friction coefficient of a coolant depend on the temperature. Accordingly, if the temperature of the coolant actually used deviates from these preferred temperature ranges by a large amount, then the surface tension and kinetic friction coefficient of the coolant would also substantially deviate from their preferred ranges. As a result, the cooling efficiency or cutting efficiency would decline significantly.

The coolant may be prepared by adding either a surfactant or a synthetic lubricant (i.e., a so-called "synthetic") to water. A predetermined surface tension or kinetic friction coefficient is achievable by changing the type or the amount of the additive appropriately. In addition, if such a coolant mainly composed of water is used, then the cutting debris of the rare-earth alloy can be easily separated from the cutting-created sludge with a magnet and the coolant can be recycled because the coolant has a relatively low viscosity. It is also possible to prevent the coolant waste disposal process from having harmful effects on natural environments. Furthermore, the amount of carbon included in the sludge can be reduced. As a result, the magnet to be made of the cutting debris collected from the sludge can have improved magnetic properties.

If the workpiece is cut with a wire saw traveling at a high velocity, then the coolant may foam to decrease the cooling efficiency unintentionally. However, by using a coolant including an antifoaming agent, such decreases in cooling efficiency due to foaming of the coolant can be minimized. Furthermore, when a coolant with a PH of about 8 to about 11 is used, the corrosion with the rare-earth alloy can be minimized. More preferably, a coolant with a PH of about 9 or more is preferably used. Moreover, by using a coolant including a rust preventive material, the oxidation of the rare-earth alloy can be reduced significantly. The amounts of these additives may be appropriately adjusted with the type and cutting conditions of the rare-earth alloy and other factors taken into account.

A wire saw, on which diamond abrasive grains are fixed with a resin layer, is preferably used as the wire saw. More specifically, a wire saw, obtained by fixing diamond abrasive grains on the outer surface of a core wire (which is preferably a piano wire) with a resin, is preferably used. Among other things, a phenol resin, an epoxy resin and a polyimide resin are particularly preferred. The reasons are as follows. First, these resins show not only high bond strengths with respect to the outer surface of the piano wire (i.e., hard-drawn wire) but also excellent wettability (i.e., permeability) with respect to the coolant as will be described later. If necessary, a filler (such as SiC or $Al_2O_3$) may be added to the resin (see Japanese Patent Publication No. 3078020, for example). Secondly, the wire saw on which abrasive grains are fixed with a resin layer is less expensive than a wire saw to be produced by an electrodeposition process, thus reducing the cost of cutting a rare-earth alloy. It should be noted that the core wire of the wire saw does not have to be a piano wire but may also be made of an Ni—Cr alloy, an Fe—Ni alloy or any other suitable alloy, W, Mo or any other suitable refractory metal, or a bundle of high-strength fibers such as nylon fibers. Also, the material of the abrasive grains is not limited to diamond, either, but may be SiC, B, C or CBN (cubic boron nitride), for example.

By using the coolant described above, the abnormal increase in the temperature of the wire saw during the cutting process can be reduced significantly compared with the situation where water is used as the coolant. Thus, derailing of the abrasive grains, peeling of the resin layer and snapping of the wire saw can be minimized. In the rare-earth alloy cutting method of this preferred embodiment of the present invention, not only the coolant but also the wire saw are selected appropriately, thus making it possible to use the wire saw for even a longer time and further reduction of the manufacturing cost. As will be described later by way of experimental examples, the abnormal derailing, resin peeling and snapping can be minimized by using a wire saw in which an average distance between two abrasive grains, which are adjacent to each other in the length direction (i.e., the traveling direction), is preferably about 150% to less than about 400% of the average grain size D of the abrasive grains, an average height of portions of the abrasive grains, protruding from the surface of the resin layer, is preferably about 70% or less of the average grain size D of the abrasive grains, and a thickness deviation percentage of the resin layer with respect to the core wire is preferably about 40%.

As will be described later by way of experimental examples, the present inventors presume, based on the results of extensive research, that by adjusting not only the density of the abrasive grains, fixed on the outer surface of the core wire with the resin layer, as measured in the length direction of the wire saw and the average height of the portions of the abrasive grains protruding from the resin layer (which will be referred to herein as a "protrusion percentage") but also the thickness deviation percentage of the resin layer with respect to the core wire, the cutting debris (or sludge) flushing capability could be maintained within a good range and the load to be placed on the respective abrasive grains during the cutting process would become uniform, thus minimizing the abnormal derailing, resin peeling and snapping.

Hereinafter, the protrusion percentage Pr and thickness deviation percentage Td, characterizing the wire saw to be used in the cutting method of this preferred embodiment of the present invention, will be defined with reference to FIGS. 1A and 1B.

Figure 1B:
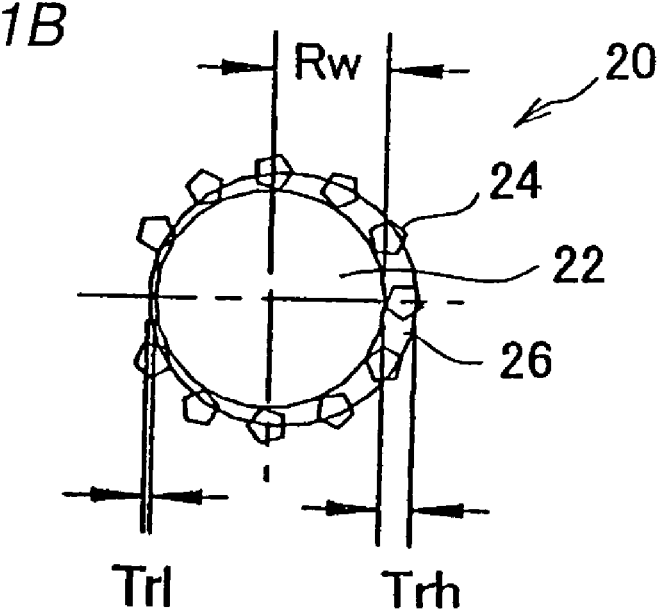
FIG. 1B is a schematic cross-sectional view showing how to define a thickness deviation percentage for a wire saw.

In the wire saw 20 shown in FIG. 1A, abrasive grains 24 are fixed on the outer surface of a core wire 22 with a resin layer 26. Supposing the average grain size of the abrasive grains 24 is D and the height of the portions of the abrasive grains 24 protruding from the resin layer 26 (i.e., the protrusion height) is P, the protrusion percentage Pr (%) is defined as the ratio of the protrusion height P to the average grain size D. That is to say, $Pr=(P/D)\times100$. The protrusion percentage Pr can be obtained from optical micrographs showing the cross sections of the wire saw 20, for example.

As disclosed in Japanese Patent Publication No. 3078020, the wire saw 20 may be made by coating the outer surface of a core wire with an abrasive grain dispersed resin (to which a solvent is added as needed) by a method called the "enamel method", for example. In this case, unless the thickness of the resin layer is adjusted sufficiently, the thickness of the resin layer 26 may become non-uniform with respect to the core wire 22 on a cross section including the diameter of the wire saw 20 (or core wire 22) as schematically shown in FIG. 1B. To evaluate such a deviation in the thickness of the resin layer 26 quantitatively, the thickness deviation percentage Td (%) is defined as follows.

Supposing the radius of the core wire 22 is Rw, the minimum thickness of the resin layer 26 is Trl and the maximum thickness of the resin layer 26 is Trh, the thickness deviation percentage Td is given by $(Trh-Trl)/\{(Trh+Trl)/2\}$. Optionally, the denominator $(Trh+Trl)/2$ may be regarded as the average thickness of the resin layer 26. The thickness deviation percentage Td is obtained by actually measuring the radius Rw of the core wire 22 and the minimum and maximum thicknesses Trl and Trh of the resin layer 26. The thicknesses of the resin layer 26 can be obtained from optical micrographs showing the cross sections of the wire saw 20, for example. Naturally, the ideal thickness deviation percentage of the resin layer 26 is 0%.

Also, as disclosed in Japanese Patent Publication No. 3078020, a wire saw 20 satisfying the conditions described above can be obtained by controlling the thickness of the resin layer with a floating dice in the process step of applying the resin by the enamel method. Such a wire saw 20 can be supplied from a general wire saw manufacturer (e.g., Allied Material Corp.) if the specifications described above are designated clearly.

To achieve the effect of small machining allowance, the wire saw 20 preferably has an outside diameter of about 0.3 mm or less, more preferably about 0.25 mm or less. The lower limit of the outside diameter of the wire saw 20 is defined so as to achieve sufficient strength. In addition, to fix abrasive grains of a predetermined size with sufficient strength, a core wire 22 with a diameter of about 0.12 mm to about 0.20 mm, more preferably about 0.15 mm to about 0.20 mm, is preferably used.

In view of the cutting efficiency, the average grain size D of the abrasive grains 24 preferably satisfies $20\ \mu m \leq D \leq 60\ \mu m$, more preferably satisfies $30\ \mu m \leq D \leq 60\ \mu m$, and most preferably satisfies $40\ \mu m \leq D \leq 60\ \mu m$.

By using a wire saw 20 according to a preferred embodiment of the present invention, good cutting efficiency and debris flushing capability are achieved. Thus, a workpiece can be machined even if the wire saw is allowed to travel at a relatively high velocity (e.g., at 1,000 m/min) and the wire saw can be used for a longer time than the conventional one.

In addition, since the rare-earth alloy can be cooled efficiently with the coolant described above, the rare-earth alloy can be constantly machined for a long time with good machining accuracy. When the coolant mainly composed of water is used, the cutting efficiency can be optimized by setting the traveling velocity at about 20–30% higher (e.g., in the range of about 1,100 m/min to about 1,200 m/min) than the situation where an oil coolant is used.

The coolant mainly composed of water for use in the cutting method of preferred embodiments of the present invention preferably has low viscosity (with a kinematic viscosity of about 1 mm$^2$/s). Accordingly, the resultant cutting debris flushing capability is lower than that achieved by an oil coolant (which usually has a kinematic viscosity of 5 mm$^2$/s or more). Thus, in order to increase the cutting debris flushing capability, the machined portion is preferably kept immersed in the coolant stored in the vessel in the cutting process. In addition, the coolant is preferably supplied into the vessel not only through its bottom but also from its opening such that the coolant is always overflowing from the opening of the vessel.

The cutting debris, which has been flushed into the low-viscosity coolant, easily precipitates and just a small amount of cutting debris is floating around the opening of the vessel. To cut the workpiece with the machined portion immersed in the coolant, the wire saw needs to be arranged so as to travel through the coolant in the vicinity of the opening of the vessel. Accordingly, the wire saw travels in the coolant including little cutting debris, and the machined portion is supplied with the coolant including little cutting debris. In particular, if the coolant is also supplied from the vessel opening so as to be always overflowing from the opening, the coolant supplied to the machined portion can have a decreased amount of cutting debris. Furthermore, the cutting debris that has been deposited on the wire saw can also be washed away mechanically with the flow of the coolant supplied from the vessel opening. The quantity of the coolant overflowing per minute is preferably about 50% or more of the volume of the vessel. Also, the amount of the coolant supplied from the opening is preferably greater than that of the coolant supplied through the bottom of the vessel.

Furthermore, if a curtain-like flow of the coolant (or the air) is formed over the four sides of the vessel opening intersecting with the wire saw traveling direction and if the surface of the overflowing coolant is kept higher than the vessel walls by reducing the amount of the coolant overflowing from the vessel opening, then an even greater quantity of coolant is supplied to the area around the machined portion. As a result, the amount of the cutting debris in the coolant can be further decreased. A discharge pressure to form the coolant flow is preferably in the range of about 0.2 MPa (i.e., about 2 kgf/cm$^2$) to about 1.0 MPa (i.e., about 10 kgf/cm$^2$), more preferably in the range of about 0.4 MPa (i.e., about 4 kgf/cm$^2$) to about 0.6 MPa (i.e., about 6 kgf/cm$^2$). The reasons are as follows. Specifically, if the discharge pressure is lower than these ranges, sufficient effects may not be achieved. However, if the discharge pressure exceeds these ranges, then the wire saw flexes so much that the machining accuracy may decrease.

Also, among a plurality of main rollers provided to make the wire saw travel thereon, two main rollers, arranged on both sides of the vessel to regulate the traveling path of the wire saw, are also preferably supplied with a coolant that has been discharged. By discharging the coolant to these main rollers, the increase in the temperature of a polymer layer (e.g., an organic polymer layer such as a urethane rubber layer), which is provided on the surface of the main rollers so as to have a wire saw guide groove, can be minimized. In addition, the cutting debris (or sludge) that has been deposited or left either on the wire saw or in the guide groove can also be washed away, thereby preventing the wire saw traveling path from deviating or the wire saw from derailing from the groove.

Also, by collecting a dirty liquid, including the sludge with the rare-earth alloy cutting debris produced by the cutting process and the coolants, and by getting the rare-earth alloy cutting debris separated out from the sludge by a magnet, the coolants can be recycled (e.g., used cyclically). As described above, since the coolant mainly composed of water has low viscosity, the cutting debris can be easily sorted out therefrom. Also, by sorting out the rare-earth alloy cutting debris, the coolant waste can be disposed of easily without doing any damage on the environment. Furthermore, carbon, which is not easily separable from an R—Fe—B based alloy (where R is one of the rare-earth elements that include Y), can be reduced and the cutting debris may also be used as a recycling material for a rare-earth alloy. Since the coolant preferably is mainly composed of water, it is easy to decrease the amount of carbon included in the rare-earth alloy that has been recycled from the cutting debris. Thus, a raw material that may be used as a material for a rare-earth magnet can be obtained. As a method of sorting out the cutting debris from the sludge, the method disclosed by the applicant of the present application in Japanese Laid-Open Publication No. 2002-36113 may be used.

By adopting the cutting method of preferred embodiments of the present invention, a rare-earth alloy can be cut with high accuracy and efficiency. Thus, a small rare-earth magnet (with a thickness of about 0.5 mm to about 3.0 mm, for example) for use in a voice coil motor to position a magnetic head can be produced with high accuracy and efficiency.

Hereinafter, a rare-earth alloy cutting method according to a preferred embodiment of the present invention will be described in further detail with reference to the accompanying drawings. In the following preferred embodiment, a method of cutting a neodymium magnet sintered body to make the neodymium magnet mentioned above will be described as an example.

A method for producing a neodymium (Nd—Fe—B based) sintered magnet will be described briefly. It should be noted that a method of making a rare-earth alloy as a magnet material is disclosed in detail in U.S. Pat. Nos. 4,770,723 and 4,792,368 identified above, for example.

First, material metals are exactly weighed to a predetermined mixture ratio and then melted in a high-frequency melting crucible within a vacuum or an argon gas atmosphere. The molten material metals are then poured into a water-cooled casting mold, thereby obtaining a material alloy with a predetermined composition. Then, this material alloy is pulverized to make a fine powder with an average grain size of about 3 µm to about 4 µm. Subsequently, this fine powder is introduced into a die and then pressed and compacted under a magnetic field. If necessary, this compacting process step is carried out after the fine powder has been mixed with a lubricant. Next, the compact is subjected to a sintering process at a temperature of about 1,000° C. to about 1,200° C., thereby obtaining a neodymium magnet sintered body. Thereafter, to increase the coercivity of the magnet, the sintered body is further subjected to an aging treatment at about 600° C. to complete the manufacturing process of the rare-earth magnet sintered body. The sintered body may have dimensions of approximately 30 mm×50 mm×50 mm, for example.

Then, the resultant sintered body is machined and cut, thereby dividing the sintered body into multiple thin plates (which will be sometimes referred to herein as "substrates" or "wafers"). Next, each of these thin plates of the sintered body is polished and finished to adjust its shape and dimensions. Subsequently, to improve the long-term reliability, the thin plate is further subjected to a surface treatment. Thereafter, the thin plate further goes through a magnetizing process and a testing process, thereby completing a neodymium permanent magnet. Alternatively, the magnetizing process may be carried out before the cutting process.

Hereinafter, a cutting process according to a preferred embodiment of the present invention will be described in further detail with reference to FIGS. 2 through 5B.

Figure 2:
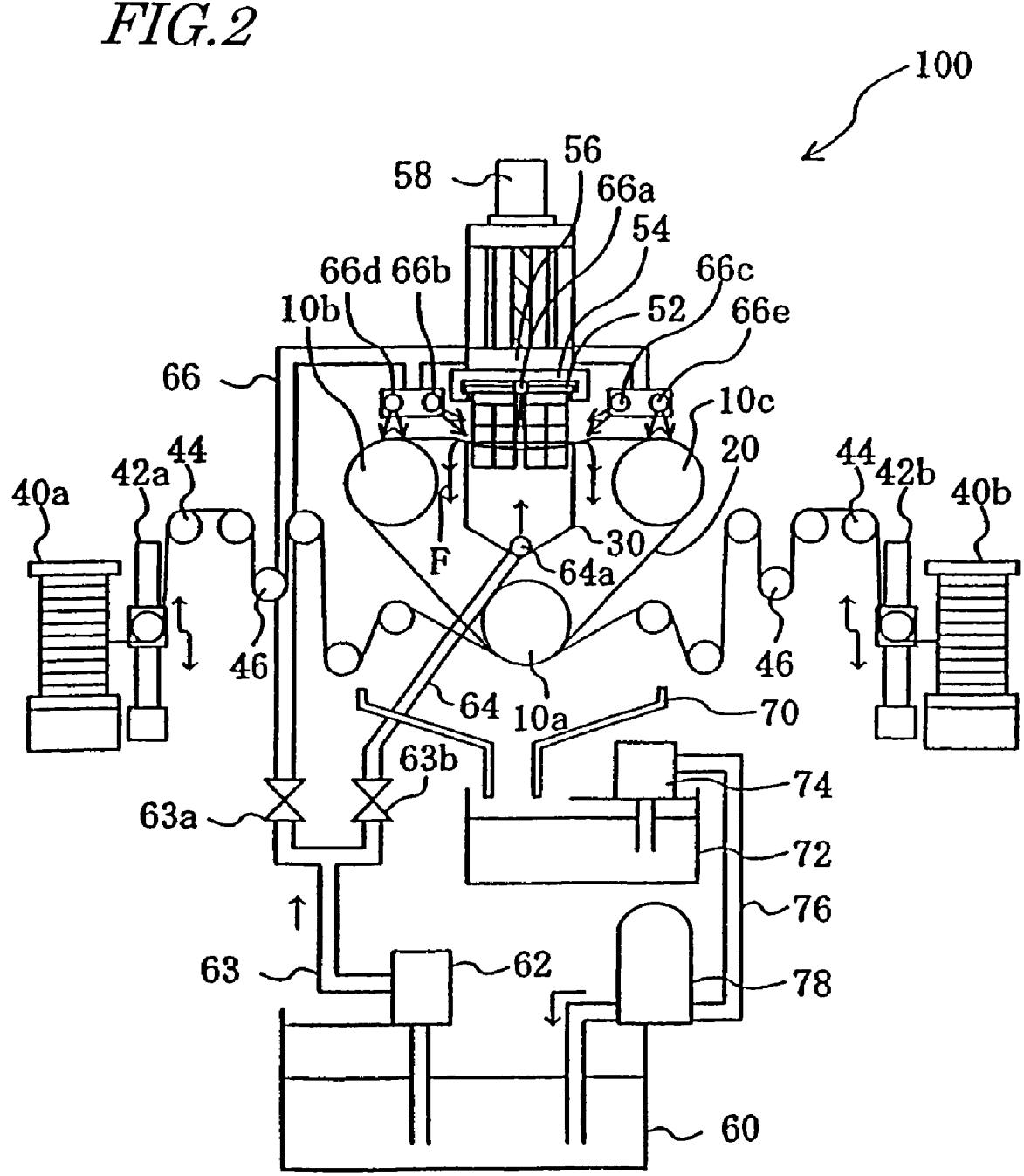
FIG. 2 is a schematic representation illustrating a wire saw machine, which can be used effectively to carry out a rare-earth alloy cutting method according to a preferred embodiment of the present invention.

FIG. 2 is a schematic representation illustrating a wire saw machine 100, which can be used effectively to carry out a rare-earth alloy cutting process according to a preferred embodiment of the present invention.

The wire saw machine 100 includes three main rollers 10a, 10b and 10c and two reel bobbins 40a and 40b. The main roller 10a, provided under a vessel 30 containing a coolant, is the drive roller, while the other main rollers 10b and 10c, arranged on both sides of the vessel 30, are driven rollers. The wire saw 20 travels back and forth while being reeled off one of the two reel bobbins (e.g., 40a) and reeled up in the other reel bobbin (e.g., 40b). That is to say, the wire saw 20 is preferably driven by a so-called "reciprocating drive method". In this case, if the reeling time of the reel bobbin 40a is longer than that of the other reel bobbin 40b, then a brand new wire saw 20 can be fed to the reel bobbin 40a while allowing the wire saw 20 to move back and forth. The wire saw 20 preferably travels at a velocity of about 600 m/min to about 1,500 m/min. And the new wire may be fed at a rate of about 1 m/min to about,5 m/min, for example.

The wire saw 20 may be strung in 150 lines, for example, between the main rollers 10a, 10b and 10c. To define the traveling path of the wire saw 20, a polymer layer (e.g., an organic polymer layer such as a urethane rubber layer) with a guide groove (having a depth of about 0.6 mm, for example, and not shown) for guiding the wire saw 20 is provided on the surface of the main rollers 10a, 10b and 10c. The line-to-line spacing of the wire saw 20 is defined by the pitch of this guide groove. And the guide groove pitch is adjusted according to the thickness of plates to be cut out from the workpiece. As the polymer layer, an inorganic polymer layer made of a silicone elastomer may also be used.

Traversers 42a and 42b for adjusting the reeling positions are provided in the vicinity of the reel bobbins 40a and 40b, respectively. Along the path leading from the reel bobbin 40a or 40b to the main roller 10a, five guide rollers 44 and one tension roller 46 are preferably provided on each side, thereby guiding the wire saw 20 and regulating its tension. The tension of the wire saw 20 may be appropriately changed according to a combination of various conditions including cut length, cutting speed and traveling velocity. For example, the wire 20 may have a tension of about 20 N to about 40 N.

The sintered body workpieces 50 obtained as described above are set in this wire saw machine 100 in the following manner.

A number of workpieces 50 are bonded together with an epoxy adhesive (not shown), for example. After these workpieces 50 have been assembled into a plurality of blocks, these blocks are fixed onto a ferrous work plate 54 with carbon base plates 52 interposed between them. The work plate 54, blocks of workpieces 50 and carbon base plates 52 are also bonded together with an adhesive (not shown). The carbon base plate 52 is subjected to the machining by the wire saw 20 after the workpieces 50 have been cut and until the work plate 54 stops descending. In this manner, the carbon base plates 52 function as a dummy for protecting the work plate 54.

In this preferred embodiment, each block is designed so as to have a size of about 100 mm as measured in the direction in which the wire saw 20 travels. Although the workpieces 50 are arranged as a plurality of blocks in the preferred embodiment described above, the size to be defined in the traveling direction of the wire saw 20 is also changeable with the surface tension of the coolant or the traveling velocity. Also, the number and arrangement of workpieces 50 that makes up a single block can change with the size of each workpiece 50. Accordingly, the workpieces 50 may be appropriately arranged as blocks of the best size in view of these considerations.

The workpieces 50, which have been set in this manner, are lowered by an elevator with a motor 58 and pressed against the traveling wire saw 20 so as to be cut and machined. The lowering velocity of the workpieces 50 is changeable with various conditions but may be within the range of about 20 mm/hr to about 50 mm/hr, for example.

The coolant stored in the coolant tank 60 is pumped up by a discharge pump 62 and transferred by way of the piping 63. The piping 63 branches into a lower pipe 64 and an upper pipe 66, which are provided with valves 63b and 63a, respectively, to control the flow rate of the coolant. The lower pipe 64 is connected to a lower nozzle 64a, which is provided at the bottom of the vessel 30 in order to immerse the machined portion in the coolant. On the other hand, the upper pipe 66 is connected to not only upper nozzles 66a, 66b and 66c for supplying the coolant from the opening of the vessel 30 but also two more upper nozzles 66d and 66e provided for the purpose of cooling the main rollers 10b and 10c, respectively.

The coolant is supplied into the vessel 30 through the upper nozzles 66a, 66b and 66c and lower nozzle 64a. At least during the cutting process, the coolant is kept overflowing from the opening of the vessel 30 as indicated by the arrow F in FIG. 2. The coolant that has overflowed from the vessel 30 is guided to, and accumulated in, a collecting tank 72 by way of the collecting pan 70 provided under the vessel 30. The collected coolant may be pumped up by a discharge pump 74 and returned to the coolant tank 60 by way of a circulating pipe 76 as shown in FIG. 2, for example. A filter 78 is preferably provided at approximately a midway point of the circulating pipe 76 so as to sort out and remove the cutting debris from the coolant collected. However, the collecting method is not limited to the illustrated one. Alternatively, a mechanism for sorting out and separating the cutting debris by magnetic force may be provided (see Japanese Laid-Open Publication No. 2002-36113, for example).

Figure 3:
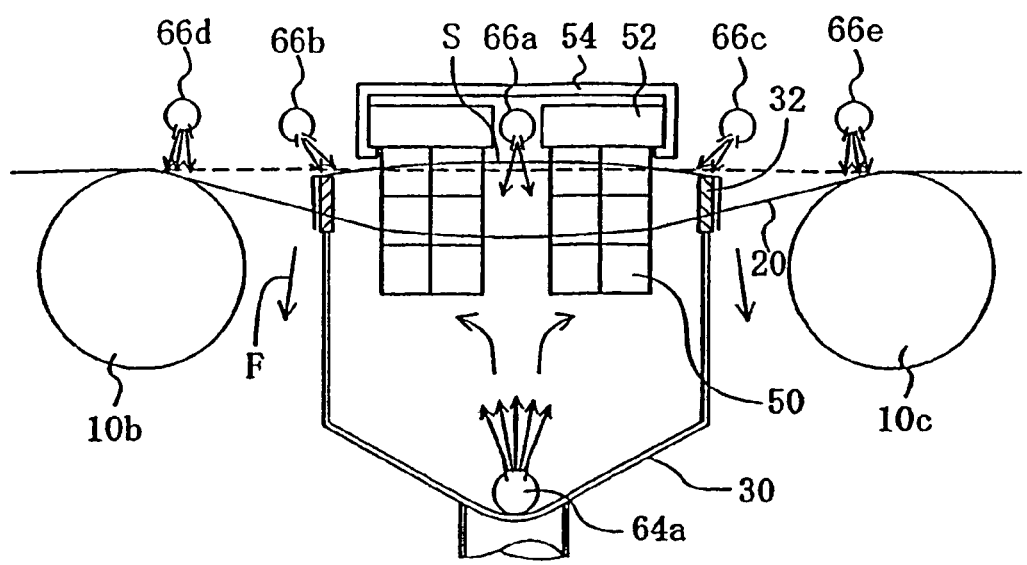
FIG. 3 is a schematic representation illustrating a configuration for the wire saw machine shown in FIGS. 1A and 1B in the vicinity of the machined portion.

Hereinafter, a cutting process according to a preferred embodiment of the present invention will be described in further detail with reference to FIG. 3.

The vessel 30 includes auxiliary walls 32 on its sidewalls, intersecting with the traveling direction of the wire saw 20, and in the vicinity of its opening. These auxiliary walls 32 may be plastic plates (e.g., acrylic plates) and are arranged so as to be located near the traveling path of the non-loaded wire saw as indicated by the dashed line in FIG. 3. When the workpieces 50 are lowered and brought into contact with the wire saw 20 so as to be cut, the wire saw 20 flexes and the machined portions are immersed in the coolant in the vessel 30 as indicated by the solid curve in FIG. 3. In this case, as the wire saw 20 is bent downward, the wire saw 20 cuts off the auxiliary walls 32, thereby forming slits. When the cutting by the wire saw 20 reaches a steady state, the magnitude of the flexure becomes constant. As a result, the wire saw 20 is moving to cut the workpieces 50 while passing the slits that have been created through the auxiliary walls 32. In this manner, the slits, formed through the auxiliary walls 32, function so as to regulate the traveling path of the wire saw 20 and contribute to stabilizing the machining accuracy.

The vessel 30 may have a capacity of about 35 L (litters), for example. During the cutting process, the vessel 30 is preferably supplied with the coolant at a flow rate of about 30 L/min through the lower nozzle 64a and at a flow rate of about 90 L/min through the upper nozzles 66a, 66b and 66c, respectively, such that the coolant is always overflowing from the opening. In order to supply the coolant to just the wire saw 20, it is not always necessary to make the coolant overflow because the wire saw 20 flexes during the cutting process as shown in FIG. 2. However, in cutting a neodymium magnet sintered body as in this example, such a configuration is preferably adopted to increase the cutting debris flushing capability.

To increase the cutting debris flushing capability, it is effective to reduce the amount of the cutting debris included in the coolant in the vicinity of the machined portions. To achieve sufficient flushing capability, the quantity of the coolant overflowing per minute is preferably about 50% or more of the vessel volume. Furthermore, a greater quantity of fresh coolant is preferably supplied from the opening of the vessel 30 rather than through the bottom thereof. In this preferred embodiment, a low-viscosity coolant mainly composed of water is preferably used. Accordingly, the cutting debris that has been flushed away into the coolant precipitates easily. For that reason, if a lot of coolant is supplied through the bottom of the vessel 30, the precipitated cutting debris may be floating around the machined portions unintentionally.

Also, the percentage of the fresh coolant to be supplied from the opening is preferably increased. That is to say, by additionally supplying the coolant from the opening of the vessel 30 and keeping the coolant overflowing from the opening, the amount of the cutting debris included in the coolant being supplied to the machined portions can be reduced. Furthermore, the cutting debris that has been deposited on the wire saw 20 can also be washed away mechanically with the flow of the coolant supplied from the opening of the vessel 30.

Also, the auxiliary walls 32 described above function as the sidewalls of the vessel 30 except for the slits that have been formed by the wire saw 20, and therefore, can contribute to keeping the surface S of the coolant high. Furthermore, if a curtain-like coolant flow is formed around the opening of the vessel 30 with the nozzles 66b and 66e so as to intersect with the traveling direction of the wire saw 20 and if the surface S of the overflowing coolant is kept higher than the auxiliary walls 32 of the vessel 30 by reducing the amount of the coolant overflowing from the opening of the vessel 30, then an even greater quantity of coolant is supplied to the area around the machined portions. As a result, the amount of the cutting debris in the coolant can be further decreased. A discharge pressure to form the coolant flow is preferably in the range of about 0.2 MPa (i.e., about 2 kgf/cm$^2$) to about 1.0 MPa (i.e., about 10 kgf/cm$^2$), more preferably in the range of about 0.4 MPa (i.e., about 4 kgf/cm$^2$) to about 0.6 MPa (i.e., about 6 kgf/cm$^2$). The reasons are as follows. Specifically, if the discharge pressure is lower than these ranges, sufficient effects may not be achieved. However, if the discharge pressure exceeds these ranges, then the wire saw 20 may flex so much that the machining accuracy may decrease.

Also, the two main rollers 10b and 10c, arranged on both sides of the vessel 30 to regulate the traveling path of the wire saw 20, are also preferably supplied with the coolant that has been discharged. By discharging the coolant to these main rollers 10b and 10c, the increase in the temperature of a polymer layer (e.g., a urethane rubber layer), which is provided on the surface of the main rollers 10b and 10c so as to have a guide groove for the wire saw 20, can be minimized. In addition, the cutting debris (or sludge) that has been deposited or left either on the wire saw 20 or in the guide groove can also be washed away, thereby preventing the traveling path of the wire saw 20 from deviating or the wire saw 20 from derailing from the groove.

Examples of the surfactants to be added to the coolant mainly composed of water include anionic surfactants and nonionic surfactants. Preferred anionic surfactants include fatty acid derivatives including fatty acid soap and naphthenic acid soap, ester sulfates such as a long-chain alcohol ester sulfate and an oil sulfate (e.g., an animal or vegetable oil sulfate), and sulfonic acids such as petroleum sulfonates. Preferred nonionic surfactants include polyoxy-ethylenes such as polyoxyethylenealkylphenyl ether and polyoxyethylene mono fatty acid ester, polyhydric alcohols such as sorbitan mono fatty acid ester, and alkylol amides such as fatty acid diethanol amide. Specifically, by adding about 2 wt % of water to a chemical solution type JP-0497N (produced by Castrol Limited), the kinetic friction coefficient can be adjusted so as to fall within the predetermined range.

Also, examples of preferred synthetic lubricants include synthetic solution types, synthetic emulsion types and synthetic soluble types. Among other things, synthetic solution types are particularly preferred. More specifically, Syntairo 9954 (produced by Castrol Limited) and #830 or #870 (produced by Yushiro Chemical Industry Co., Ltd.) may be used. In any case, by adding about 2 wt % to about 10 wt % of such a lubricant to water, the surface tension (or kinetic friction coefficient) can be controlled to be within a preferred range.

Furthermore, by adding a rust preventive material, corrosion of the rare-earth alloy can be prevented. In particular, in cutting an R—Fe—B based rare-earth alloy, PH is preferably set somewhere between about 8 and about 11, more preferably at least equal to about 9. Examples of rust preventive materials include organic ones and inorganic ones. Preferred organic rust preventive materials include carboxylates such as oleates and benzoates and amines such as triethanolamine. Preferred inorganic rust preventive materials include phosphates, borates, molybdates, tungstates and carbonates.

Also, a nitrogen compound such as benztriazol may be used as a nonferrous metal anticorrosive agent. A formaldehyde donor such as hexahydrotriazine may be used as a preservative.

A silicone emulsion may be used as an antifoaming agent. By adding the antifoaming agent, foaming of the coolant can be reduced, the permeability and cooling effect of the coolant can be improved, and the abnormal temperature increase or abnormal abrasion of the wire saw 20 can be minimized.

Figure 4:
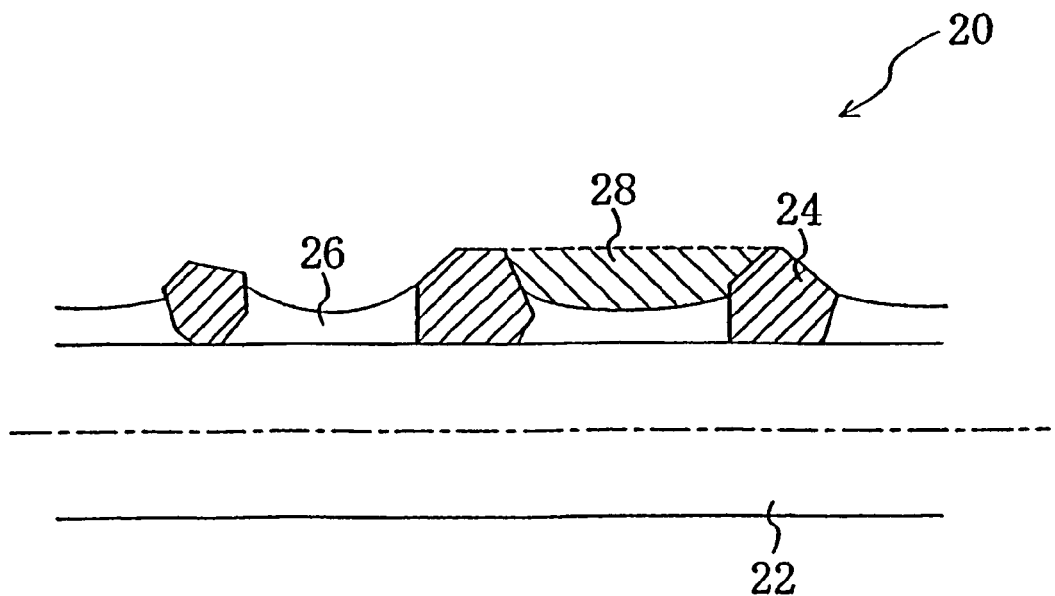
FIG. 4 schematically illustrates a cross-sectional structure for the wire saw that can be used effectively to carry out the rare-earth alloy cutting method of a preferred embodiment of the present invention.

Next, the structure of the wire saw 20 to be preferably used in this preferred embodiment will be described with reference to FIGS. 4, 5A and 5B. It should be noted that the structure of the lower half of the wire saw 20 below the one-dot chain is simplified in FIG. 4.

A wire saw, obtained by fixing diamond abrasive grains 24 on the outer surface of a core wire (e.g., a piano wire) 22 with a resin layer 26, is preferably used as the wire saw 20. Among other things, a phenol resin, an epoxy resin and a polyimide resin are particularly preferred. This is because these resins show not only high bond strengths with respect to the outer surface of the piano wire (i.e., hard-drawn wire) 22 but also excellent wettability (i.e., permeability) with respect to the coolant described above.

More specifically, a preferred wire saw 20 having an outside diameter of about 0.24 mm may be obtained by fixing diamond abrasive grains, having an average grain size of about 40 µm, on the outer surface of a piano wire 22, having a diameter of about 0.18 mm, with a phenol resin layer 26, for example. Also, considering the cutting efficiency and the cutting debris (sludge) flushing efficiency, the average distance between two adjacent abrasive grains 26 in the length direction of the wire saw 20 (i.e., the axial direction that is parallel to the one-dot chain in FIG. 4) is preferably about 150% to less than about 400% of the average grain size D of the abrasive grains.

Figure 5A:
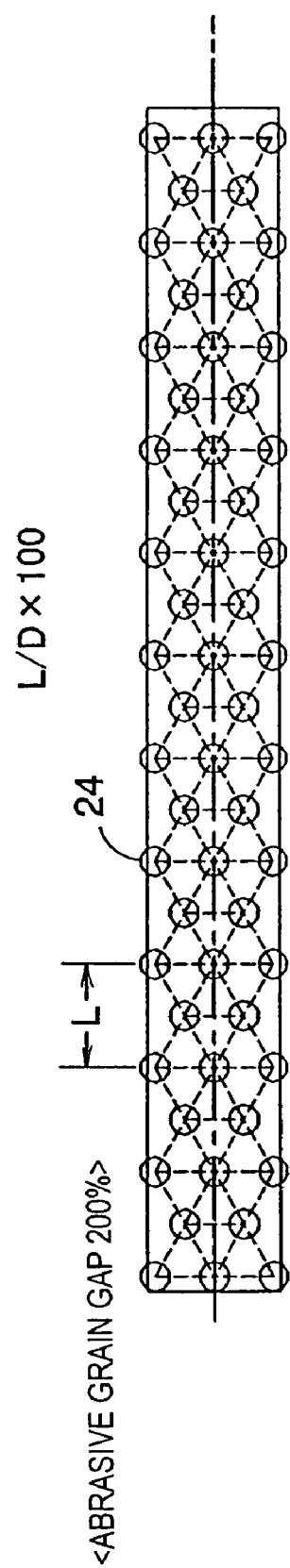
Figure 5B:
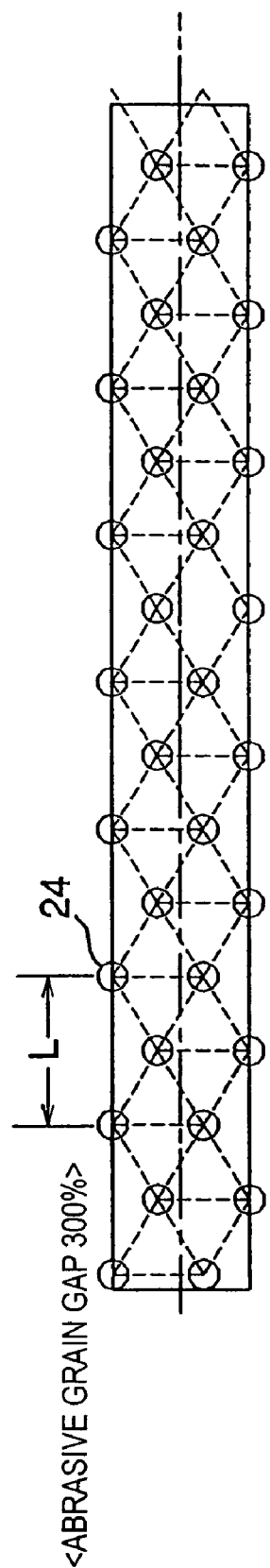

For example, if the average distance L between two abrasive grains, which are adjacent to each other in the length direction of the wire saw 20, is about 200% or about 300% of the average grain size D of the abrasive grains as shown in FIGS. 5A and 5B, then the load placed on the respective abrasive grains 24 is reduced. As a result, the abnormal derailing of the abrasive grains 24, peeling of the resin layer 26 and snapping are minimized. In other words, if the average distance L between adjacent abrasive grains becomes about 400% or more, then the distribution density of the abrasive grains 24 becomes too low. Thus, the load to be placed on the respective abrasive grains 24 during the cutting process becomes so heavy as to cause that abnormal derailing. However, if the average distance L between adjacent abrasive grains becomes less than about 150%, then the distribution density of the abrasive grains 24 becomes too high. Accordingly, the chip pocket capacity to be described later is insufficient and the cutting debris flushing capability decreases. As a result, the cutting efficiency decreases, too.

FIGS. 5A and 5B schematically illustrate uniform distributions of the abrasive grains 24 by extending the outer surface of the wire saw 20 (with a length of about 1.6 mm, for example) into plan views. Actually, though, the abrasive grains 24 are distributed non-uniformly. However, the semi-quantitative effects of the difference in average distance L between adjacent abrasive grains on the distribution density of the abrasive grains can be understood from these drawings. The average distance L between adjacent abrasive grains on the wire saw 20 can be actually obtained using optical micrographs, for example.

Furthermore, the protrusion percentage of the abrasive grains 22 on the wire saw 20 is preferably about 70% or less. This is because if the protrusion percentage exceeds about 70%, then the load placed on the abrasive grains 22 cannot be supported by the resin layer 26 sufficiently so as to avoid abnormal derailing and resin layer peeling. Also, considering the cutting debris flushing capability, the protrusion percentage of the abrasive grains preferably exceeds about 40%. This is because if the protrusion percentage is about 40% or less, then the space 28 between the abrasive grains 22. (i.e., the chip pocket) has such a small capacity as to decrease not only the cutting debris flushing capability but also cutting efficiency often. The size of the chip pocket 28 depends on the distance between adjacent abrasive grains described above.

Furthermore, in the cutting method of this preferred embodiment, a wire saw 20, of which the resin layer 26 has a thickness deviation percentage of about 40%, is preferably used. The reason is as follows. Specifically, if the thickness deviation percentage exceeds about 40%, then the load being placed on the resin layer 26, on which the abrasive grains 24 are fixed, becomes non-uniform. Accordingly, if the cutting process is carried out with such a wire saw 20, then the strength of the resin layer 26 will be locally insufficient, thereby derailing the abrasive grains 24 and peeling off the resin layer 26 easily.

Hereinafter, the relationships between the average distance L between adjacent abrasive grains, the protrusion percentage and thickness deviation percentage of the abrasive grains on the wire saw 20 and the peeling and snapping of the resin layer 26, and the profile irregularity (i.e., winding) of the cut surface will be described by way of experimental examples.

In the following experimental examples, a sintered block of a neodymium magnet (having a length of about 40 mm in the traveling direction, a lateral length of about 50 mm and a thickness of about 30 mm, for example) was cut with the wire saw machine 100 shown in FIG. 2 by the method described above so as to divide the lateral sides of the block. As the coolant, a coolant, of which the surface tension and kinetic friction coefficient were adjusted to about 34.6 mN/m and about 0.13, respectively, by adding WS-250B (produced by Yushiro Chemical Industry Co., Ltd.) to tap water, was used. The wire saw 20 was allowed to travel at a velocity of about 1,100 m/min and at a cutting speed of about 40 mm/hr (in the thickness direction).

The core wire (e.g., piano wire) 22 of the wire saw 20 had a diameter of about 0.18 mm. The abrasive grains (e.g., diamond abrasive grains) 24 had an average grain size of about 42 μm. A phenol resin was used as the resin layer 26, which had an average thickness (i.e., ideal thickness) of about 20 μm. The average distance L between adjacent abrasive grains and the protrusion percentage and thickness deviation percentage of the abrasive grains on the wire saw 20 were obtained using optical micrographs. It should be noted that the thickness deviation percentage was obtained based on the measuring results of about 10 cross sections that were spaced apart from each other at an interval of about 500 mm. The peeling of the resin layer 26 was evaluated by viewing the appearance of the wire saw 20, which had been used to process a sintered block of a neodymium magnet for four hours, with the eyes. For example, if the wire saw 20 had an overall length of about 200 m and if the sum of the lengths of peeled portions (each having a length of at least about 5 mm) was about 10 m or more, then the resin layer was regarded as "peeled". Specifically, if the sum of the lengths of peeled portions was about 10 m to about 60 m, then the resin layer was regarded as "peeled slightly" And if the sum exceeded about 60 m, then the resin layer was regarded as "peeled all over". Also, if the "slightly peeled" resin layer had an interval of about 20 m or more between adjacent peeled portions, then the resin layer was regarded as "peeled intermittently". Furthermore, the profile irregularity of the cut surface was also measured with a contact-type roughness meter, and the maximum winding value within a width of about 25 mm was adopted as a representative value.

The present inventors analyzed the effects of the average distance L between adjacent abrasive grains in the length direction of the wire saw 20. The results are shown in the following Table 1.

As is clear from Table 1, if the average distance L between adjacent abrasive grains was within the range of about 150% to less than about 400% of the average grain size of the abrasive grains, no peeling was produced in the resin layer 26 and the cut surface also had as small a profile irregularity as less than about 8 μm. In contrast, if the average distance L between adjacent abrasive grains was less than about 150% of the average grain size, then the cutting efficiency was too low to achieve a cutting speed of about 40 mm/hr easily. Also, if the average distance L between adjacent abrasive grains became about 400% or more of the average grain size, the resin layer 26 peeled. And if the average distance L reached about 600% of the average grain size, the resin layer 26 peeled all over the wire saw 20 and sometimes the wire saw 20 snapped. Furthermore, if the average distance L between adjacent abrasive grains was about 400% or more of the average grain size, the profile irregularity of the cut surface was as large as 8 m or more. Taking these results into consideration, it can be seen that by setting the average distance L between adjacent abrasive grains on the wire saw 20 within the range of about 150% to less than about 400% of the average grain size, the life of the wire saw 20 can be extended and a sufficient profile irregularity is achieved for the cut surface.

TABLE 1

| Average abrasive grain size D (μm) | 42 | 42 | 42 | 42 | 42 | 42 | 42 | 42 | 42 |
|---|---|---|---|---|---|---|---|---|---|
| Average grain-to-grain distance L (μm) | 63 | 71.4 | 84 | 105 | 126 | 168 | 210 | 252 | 294 |
| (L/D) × 100 (%) | 150 | 170 | 200 | 250 | 300 | 400 | 500 | 600 | 700 |
| Cut surface profile irregularity (μm) | 4.2 | 3.5 | 3.5 | 3.2 | 4.2 | 8 | 10 | 12 | — |
| Resin layer peeled? | No | No | No | No | No | Yes, slightly | Yes, intermittently | Yes, all over | Snapped |

The present inventors also analyzed the effects of the protrusion percentage of the abrasive grains 24. The results are shown in the following Table 2.

As can be seen from Table 2, if the wire saw 20 used had a protrusion percentage of about 71% or more, the resin layer 26 started to peel off. And if the wire saw 20 had a protrusion percentage exceeding about 83%, snapping was produced. Also, if the wire saw 20 adopted had a protrusion percentage of about 71% or more, the cut surface had a profile irregularity (winding) of about 10 m or more. More preferably, a wire saw 20 with a protrusion percentage of about 60% or less is used because the profile irregularity of the cut surface can be reduced to about 8 m or less. However, if a wire saw with a protrusion percentage of less than about 40% was used, no resin layer peeling was produced, a sufficient profile irregularity was achieved for the cut surface but the cutting efficiency sometimes decreased. This is why the protrusion percentage is preferably about 40% or more.

TABLE 2

| Average abrasive grain size D (μm) | 42 | 42 | 42 | 42 | 42 | 42 | 42 | 42 | 42 |
|---|---|---|---|---|---|---|---|---|---|
| Abrasive grain protrusion height (μm) | 0 | 5 | 10 | 15 | 20 | 25 | 30 | 35 | <35 |
| Abrasive grain protrusion percentage (%) | 0 | 12 | 24 | 36 | 48 | 60 | 71 | 83 | <83 |
| Cut surface profile irregularity (μm) | 5.4 | 3.5 | 3.5 | 3.2 | 4.2 | 8 | 10 | 12 | — |
| Resin layer peeled? | No | No | No | No | No | No | Yes, intermittently | Yes, all over | Snapped |

The present inventors also analyzed the effects of the thickness deviation percentage of the resin layer 26. The results are shown in the following Table 3.

As is clear from Table 3, if the wire saw 20 used had a thickness deviation percentage of about 50%, then the resin layer 26 peeled. And if the wire saw 20 had a thickness deviation percentage of about 100% or more, snapping was produced. On the other hand, if the wire saw 20 had a thickness deviation percentage of less than about 40%, no peeling was observed in the resin layer 26 and the cut surface profile irregularity was as small as about 4 μm or less. More preferably, the thickness deviation percentage is about 30% or less. However, even a thickness deviation percentage of about 40% or less is sufficiently mass-producible level.

It should be noted that the resin layer 26 of the wire saw 20 may or may not peel or snap depending on the tension of the wire saw 20 traveling between the rollers, too. The results described above were obtained when the wire saw 20 had a tension of about 30 N. However, substantially the same results were obtained even when the wire saw had a tension of about 25 N to about 35 N.

TABLE 3

| Average grain size D (μm) | 42 | 42 | 42 | 42 | 42 | 42 |
|---|---|---|---|---|---|---|
| Ideal thickness of resin layer (μm) | 20 | 20 | 20 | 20 | 20 | 20 |
| Minimum thickness of resin layer (μm) | 20 | 17 | 16 | 15 | 10 | 5 |
| Maximum thickness of resin layer (μm) | 20 | 23 | 24 | 25 | 30 | 35 |
| Radius (μm) of core wire | 90 | 90 | 90 | 90 | 90 | 90 |
| Thickness deviation percentage (%) | 0 | 30 | 40 | 50 | 100 | 150 |
| Cut surface profile irregularity (μm) | 3.5 | 4 | 4 | 6 | 12 | — |
| Resin layer peeled? | No | No | No | Yes, slightly | Yes, all over | Snapped |

Next, a preferred structure for the main rollers 10a, 10b and 10c of the wire saw machine 100 including the wire saw will be described.

Figure 7:
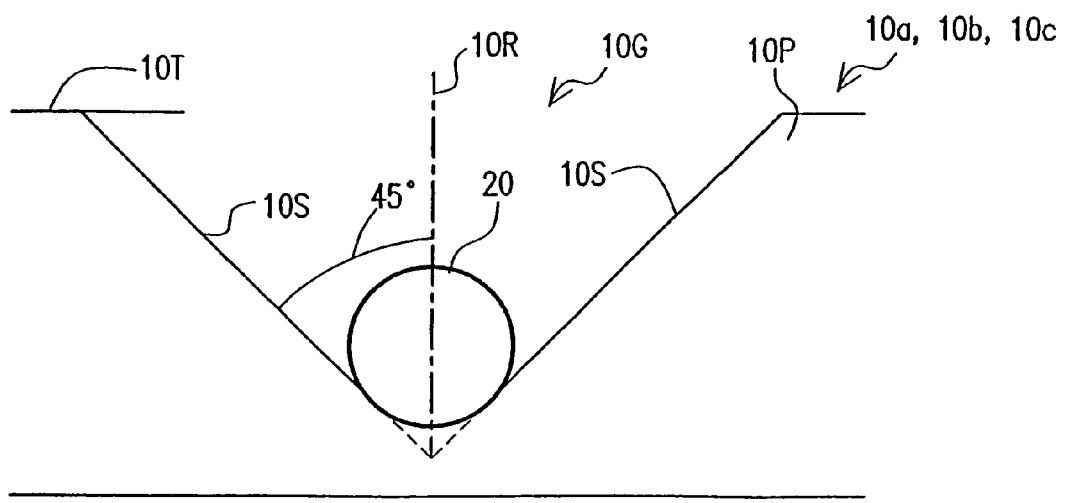
FIG. 7 schematically illustrates a cross-sectional structure for a conventional roller.

If a coolant mainly composed of water is used, the wire saw snapping rate increases (i.e., the wire saw snaps in a shorter time) and the machining accuracy decreases as compared with a situation where an oil coolant is used. As a result of various experiments, the present inventors discovered that if the cross-sectional shape of the guide groove 10G provided on the polymer layer 10P of the rollers 10a, 10b and 10c is designed such that the pair of sloped surfaces 10S of the guide groove 10G defines an angle of about 25 degrees to less than about 45 degrees (which will be referred to herein as a "tilt angle α") with respect to the radial direction 10R of the roller 10a as schematically shown in FIG. 7, the snapping of the wire saw 20 can be further reduced and sufficient machining accuracy is achieved. More preferably, the tilt angle is about 30 degrees to about 35 degrees.

Both of the two sloped surfaces 10S of the guide groove 10G preferably define the tilt angle falling within that range with respect to the radial direction R of the roller 10a as shown in FIG. 7. However, if at least one of the two sloped surfaces 10S has a tilt angle falling within that range, then the wire snapping can be minimized effectively and sufficient machining accuracy is achieved.

In the prior art, a structure in which the sloped surface 10S of the guide groove 10G defines a tilt angle of about 45 degrees or more with respect to the radial direction R of the roller is adopted as shown in FIG. 7, for example. Such a structure is adopted to remove the sludge sufficiently efficiently from the guide groove 10G. Among other things, a rare-earth alloy includes a main phase causing a brittle fracture and a grain boundary phase causing a ductile fracture, thus producing high cutting resistance. In addition, the rare-earth alloy has such a heavy specific gravity that it is not easy to remove a sludge including the rare-earth alloy. For that reason, to remove the sludge more efficiently, the tilt angle is preferably greater than about 45 degrees.

However, the present inventors discovered and confirmed via experiments that even if the tilt angle of the sloped surface 10S was greater than about 45 degrees, the wire snapping rate did not decrease so much but rather the machining accuracy decreased. Hereinafter, this phenomenon will be described with reference to FIG. 8. As already described with reference to FIG. 2, the wire saw 20 is wound so as to form a plurality of traveling lines that are parallel to each other between the rollers 10a, 10b and 10c. The position of the wire saw 20, which forms those traveling lines, is defined by the guide grooves 10G that are provided in the polymer layers 10P of the rollers 10a, 10b and 10c. Accordingly, in passing from one traveling line to its adjacent one, the wire saw 20 is obliquely wound around the guide grooves 10G. This obliquely stretched wire saw 20 receives a torsional force from the slopes 10S of the guide grooves 10G. Also, the more obliquely the wire saw 20 is stretched, the greater the torsional force the wire saw 20 receives.

Figure 8:
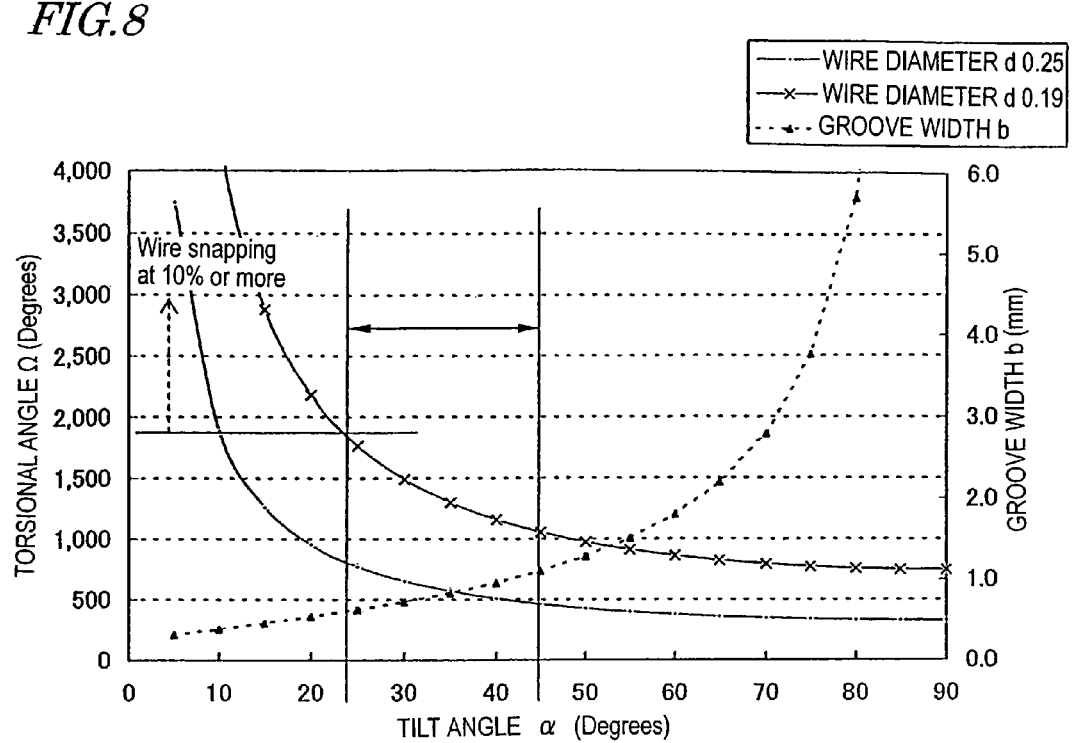
FIG. 8 is a graph showing relationships between the tilt angle of the slope of the roller guide groove and the wire saw torsional angle.

FIG. 8 is a graph showing a relationship between the tilt angle of the sloped surface 10S of the roller guide groove and the wire saw torsional angle. The torsional angle $\Omega$ is proportional to the torsional force applied from the roller to the wire saw 20. When the torsional angle $\Omega$ is 360 degrees, it is shown that the wire saw has been subjected to one full torsion. It should be noted that the results shown in FIG. 8 were obtained by performing dynamic model calculations on the configuration to be described below. Also, the results shown in FIG. 8 were obtained based on the assumption that the tilt angles of the two sloped surfaces 10S were equal to each other.

Further, 200 lines of the wire saw 20 were stretched at a tension of about 30 N (i.e., about 3 kgf) between the pair of rollers (e.g., the rollers 10b and 10d shown in FIG. 1) having a diameter of about 170 mm, which were arranged at a span of about 450 mm. The wire saw 20 was allowed to travel back and forth in a cycle time of about 120 seconds and at a new wire feed rate of about 2 m/min. In that case, after the wire saw 20 had made 190 rounds, the wire saw got out of the roller.

As a result of various experiments, it was discovered that when the wire saw was subjected to such torsional force that 5 full torsions (i.e., Q=1,800 degrees) occurred during one span (about 450 mm), the wire saw 20 made about 500 torsions while traveling through the 200 lines. That is to say, if the wire saw was subjected to a torsional force that caused 1,000 torsions (=200 lines×5 times), approximately 50% of the torsions were accumulated as actual torsions. Thus, the torsional angle $\Omega$ as the ordinate of FIG. 8 was obtained by multiplying a torsional angle, corresponding to torsional force estimated by the dynamic model calculations, by about 0.5. Furthermore, based on the results of a static torsional fracture strength test, it was estimated that when the torsional angle actually accumulated in the wire saw 20 reached approximately 1,800 degrees (i.e., 5 full torsions), the wire saw should cause a fracture at a probability of about 10%.

As can be seen from FIG. 8, as the tilt angle of the groove 10G increases, the torsional force (or torsional angle) decreases steadily and uniformly. Suppose the wire saw 20 causes a fracture simply due to the torsional force. In that case, if the wire saw 20 is relatively thin (e.g., has a diameter d of about 0.19 mm), then the fracture of the wire saw 20 can be avoided by setting the tilt angle equal to or greater than about 10 degrees. Also, even if the wire saw 20 is relatively thick (e.g., has a diameter d of about 0.25 mm), the fracture of the wire saw 20 can be avoided by setting the tilt angle equal to or greater than about 25 degrees.

According to the results of experiments, however, no matter whether the wire saw 20 was relatively thin or thick, the wire snapping percentage did not decrease so much once the tilt angle exceeded about 45 degrees. Also, if the tilt angle was about 45 degrees or more, the machining accuracy decreased unintentionally.

Figure 6:
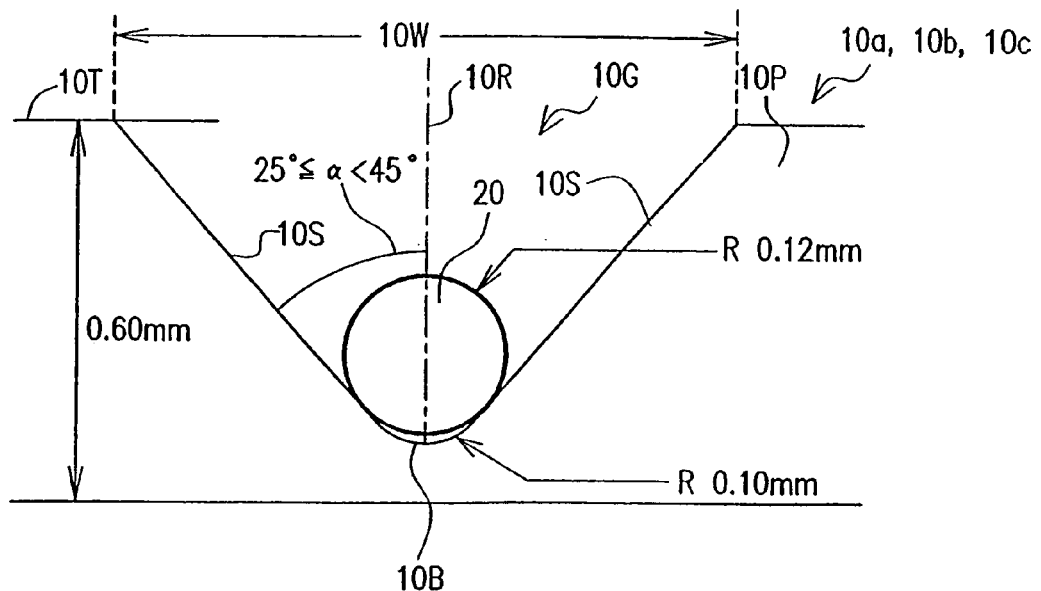
FIG. 6 schematically illustrates a cross-sectional structures for rollers that are preferably used in the wire saw machines of preferred embodiments of the present invention.

The reasons are believed to be as follows. Specifically, as the tilt angle increases, the width 10W of the guide groove 10G (see FIG. 6) increases, thereby allowing the wire saw 20 to swing within the guide groove 10G or even jump to an adjacent guide groove 10G. Then, the tension or torsional force applied to the wire saw 20 becomes non-uniform to produce significant stress locally. As a result, the wire saw 20 snaps. Also, the machining accuracy decreases because the wire saw 20 could not travel along the groove 10G constantly. The experiments were carried out by using a urethane rubber layer as the polymer layer 10P and an approximately 10% aqueous solution of #830 produced by Yushiro Chemical Industry Co., Ltd. as the coolant. Also, rare-earth sintered magnet workpieces were cut as in the experimental example described above.

Considering these results, the sloped surfaces 10S of the guide groove 10G preferably have a tilt angle of about 25 degrees to less than about 45 degrees. Also, to minimize the snapping of the wire saw 20, the tilt angle is preferably about 30 degrees or more such that the torsional force decreases. To achieve high machining accuracy, the tilt angle is preferably about 35 degrees or less. Furthermore, the bottom 10B of the guide groove 10G is preferably shaped so as to have a somewhat smaller radius of curvature than the radius of the wire saw 20.

By using such a wire saw machine 100, the wire saw 20, which already has secured a longer life due to the effects of the preferred embodiments described above, can have an even longer life. Particularly when a relatively large torsional force is produced (e.g., where the roller-to-roller distance is short), this preferred embodiment achieves significant effects.

Preferred embodiments of the present invention have been described as preferably being applied to the wire saw machine 100. However, the present invention is in no way limited to those specific preferred embodiments. Alternatively, the present invention is also applicable for use in an endless wire saw machine using a single reel bobbin (see Japanese Laid-Open Publication No. 11-198018, for example).

According to the present invention, in a situation where a rare-earth alloy is cut with a wire saw machine using a coolant that is mainly composed of water, the life of the wire saw can be extended. Thus, a rare-earth sintered alloy to make a rare-earth sintered magnet for use in a voice coil motor can be cut efficiently by using such an environmentally friendly coolant mainly composed of water. That is to say, the manufacturing cost of the rare-earth sintered magnets can be reduced.

The invention claimed is:

1. A method of cutting a rare-earth alloy with a wire saw comprising the steps of:
   providing a wire saw by fixing abrasive grains on a core wire with a resin layer, wherein an average distance between two of the abrasive grains, which are adjacent to each other in a length direction, is about 150% to less than about 400% of the average grain size of the abrasive grains, an average height of portions of the abrasive grains, protruding from the surface of the resin layer, is about 70% or less of the average grain size of the abrasive grains, and a thickness deviation percentage of the resin layer with respect to the core wire is about 40%;
   providing a coolant, which is mainly composed of water and has a surface tension of about 25 mN/m to about 60 mN/m at approximately 25° C.; and
   moving the wire saw so as to cut the rare-earth alloy while a portion of the rare-earth alloy being cut by the wire saw is immersed in the coolant.

2. The rare-earth alley cutting method of claim 1, wherein the average grain size D of the abrasive grains satisfies 20 µm≦D≦60 µm.

3. The rare-earth alloy cutting method of claim 1, wherein the core wire has a diameter of about 0.12 mm to about 0.2 mm.

4. The rare-earth alloy cutting method of claim 1, wherein the resin layer is made of one of a phenol resin, an epoxy resin and a polyimide resin.

5. The rare-earth alloy cutting method of claim 1, further including the step of providing a plurality of rollers, wherein each of the plurality of rollers includes a polymer layer on which a guide groove is provided, the guide groove has a pair of sloped surfaces, at least one of the sloped surfaces of the guide groove defines an angle of about 25 degrees to less than about 45 degrees with respect to a radial direction of the roller, wherein the step of moving the wire saw includes the steps of moving the wire saw on the plurality of rollers and passing the wire between the sloped surfaces of the guide groove.

6. The rare-earth alloy cutting method of claim 1, wherein the rare-earth alloy is an R—Fe—B based rare-earth sintered alloy.

7. The rare-earth alloy cutting method of claim 6, wherein the rare-earth alloy is an Nd—Fe—B based rare-earth sintered alloy.

8. The rare-earth alloy cutting method of claim 1, further including feeding the wire saw with a tension about 25 N to about 35 N while moving the wire saw to cut the rare-earth alloy.

9. The rare-earth alloy cutting method of claim 1, wherein the coolant is at least approximately 70 wt % water.

10. The rare-earth alloy cutting method of claim 1, wherein a temperature of the coolant is about 15° C. to about 35° C.

11. The rare-earth alloy cutting method of claim 1, wherein the coolant has at least one of a surfactant, a synthetic lubricant, an antifoaming agent, a pH of about 8 to about 11, and a rust preventive material.

12. The rare-earth alloy cutting method of claim 1, wherein the wire saw is made of one of a piano wire, Ni—Cr alloy, Fe—Ni alloy, W, Mo, and a bundle of nylon fibers.

13. The rare-earth alloy cutting method of claim 1, wherein the abrasive grains are made of one of diamond, SiC, B, C and CBN.

14. A method of cutting a rare-earth alloy with a wire saw comprising the steps of:
   providing a wire saw by fixing abrasive grains on a core wire with a resin layer, wherein an average distance between two of the abrasive grains, which are adjacent to each other in a length direction, is about 150% to less than about 400% of the average grain size of the abrasive grains, an average height of portions of the abrasive grains, protruding from the surface of the resin layer, is about 70% or less of the average grain size of the abrasive grains, and a thickness deviation percentage of the resin layer with respect to the core wire is about 40%;
   providing a coolant, which is mainly composed of water and has a kinetic friction coefficient of about 0.1 to about 0.3 at approximately 25° C. with respect to the rare-earth alloy; and
   moving the wire saw so as to cut the rare-earth alloy while a portion of the rare-earth alloy being cut by the wire saw is immersed in the coolant.

15. The rare-earth alloy cutting method of claim 14, wherein the average grain size D of the abrasive grains satisfies 20 µm≦D≦60 µm.

16. The rare-earth alloy cutting method of claim 14, wherein the core wire has a diameter of about 0.12 mm to about 0.2 mm.

17. The rare-earth alloy cutting method of claim 14, wherein the resin layer is made of one of a phenol resin, an epoxy resin and a polyimide resin.

18. The rare-earth alloy cutting method of claim 14, further including the step of providing a plurality of rollers, wherein each of the plurality of rollers includes a polymer layer on which a guide groove is provided, the guide groove has a pair of sloped surfaces, at least one of the sloped surfaces of the guide groove defines an angle of about 25 degrees to less than about 45 degrees with respect to a radial direction of the roller, wherein the step of moving the wire saw includes the steps of moving the wire saw on the plurality of rollers and passing the wire between the sloped surfaces of the guide groove.

19. The rare-earth alloy cutting method of claim 14, wherein the rare-earth alloy is an R—Fe—B based rare-earth sintered alloy.

20. The rare-earth alloy cutting method of claim 19, wherein the rare-earth alloy is an Nd—Fe—B based rare-earth sintered alloy.

21. The rare-earth alloy cutting method of claim 14, further including feeding the wire saw with a tension about 25 N to about 35 N while moving the wire saw to cut the rare-earth alloy.

22. The rare-earth alloy cutting method of claim 14, wherein the coolant is at least approximately 70 wt % water.

23. The rare-earth alloy cutting method of claim 14, wherein a temperature of the coolant is about 15° C. to about 35° C.

24. The rare-earth alloy cutting method of claim 14, wherein the coolant has at least one of a surfactant, a synthetic lubricant, an antifoaming agent, a pH of about 8 to about 11, and a rust preventive material.

25. The rare-earth alloy cutting method of claim 14, wherein the wire saw is made of one of a piano wire, Ni—Cr alloy, Fe—Ni alloy, W, Mo, and a bundle of nylon fibers.

26. The rare-earth alloy cutting method of claim 14, wherein the abrasive grains are made of one of diamond, SiC, B, C and CBN.

* * * * *